July 3, 1962 V. A. BOUFFORT 3,042,132
TWO-WHEELED MOTOR VEHICLE OF THE SCOOTER TYPE
Filed Dec. 27, 1960 2 Sheets-Sheet 1

INVENTORS
VICTOR ALBERT BOUFFORT
BY Irwin S. Thompson
ATTY.

July 3, 1962   V. A. BOUFFORT   3,042,132
TWO-WHEELED MOTOR VEHICLE OF THE SCOOTER TYPE
Filed Dec. 27, 1960   2 Sheets-Sheet 2
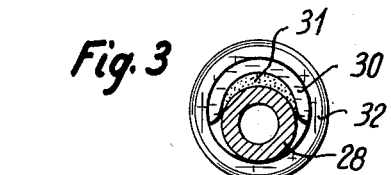
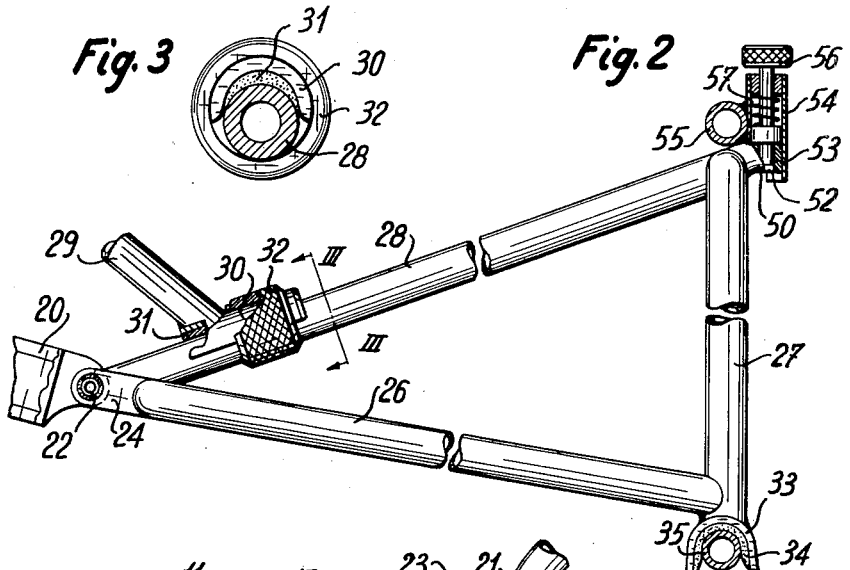
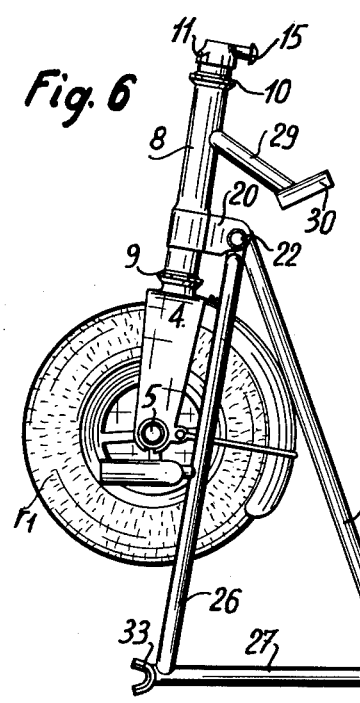
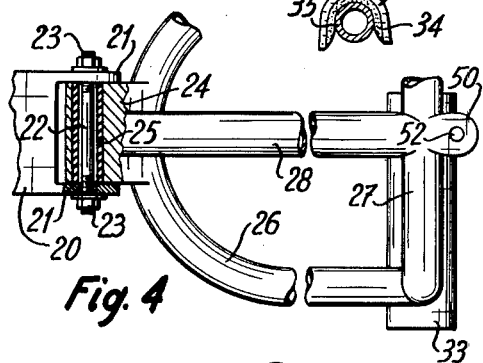
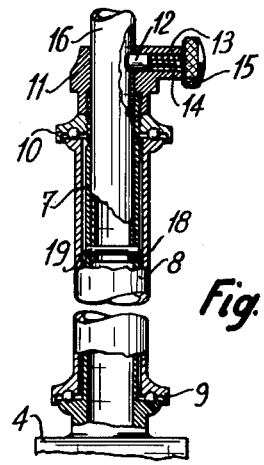
INVENTOR
VICTOR ALBERT BOUFFORT
BY Irwin S. Thompson
ATTY.

United States Patent Office 3,042,132
Patented July 3, 1962

3,042,132
TWO-WHEELED MOTOR VEHICLE OF THE
SCOOTER TYPE
Victor Albert Bouffort, 31 Place de l'Hotel-de-Ville,
Bondy, Seine, France
Filed Dec. 27, 1960, Ser. No. 78,356
Claims priority, application France Dec. 29, 1959
4 Claims. (Cl. 180—32)

The present invention relates to a motor vehicle of the scooter type comprising, on the one hand, a front part formed by the front fork and the handle-bar and, on the other hand, a rear part including a chassis protecting the rear wheel, the engine and the change-speed gear, and capable of containing the front part, in order to facilitate the transport of the scooter. The said vehicle is characterized by the fact that the chassis is suspended and connected to the front part, not suspended, by means of a connecting member having the general shape of a pyramid the base of which, substantially situated in a vertical plane, is removably fixed to the suspended chassis, by the fact that the said pyramid bears through its lower edge upon an element of the said chassis, the said edge being situated adjacent to the centre of gravity of the vehicle, while the apex of the said pyramid is hinged to the lower part of a sleeve in which pivots the tube of the front fork and by the fact that a brace determines the running position of the front fork relative to the said connecting member and transmits the shocks to which is subjected the front fork to the said connecting member towards the rear of the vehicle and towards the ground, the said connecting member re-transmitting the said shocks to the suspended chassis through the agency of the said edge bearing on an element of the said chassis.

The accompanying drawings show diagrammatically and by way of example an embodiment of the vehicle, object of the invention.

FIG. 2 is a profile view, on a larger scale, of the connecting member, certain parts being in cross section.

FIG. 3 is a cross sectional view along line III—III of FIG. 2.

FIG. 4 is a plan view, on a smaller scale, of the said connecting member.

FIG. 5 is a partial view in cross section of the front part of the vehicle.

FIG. 6 is a view of the front fork and the connecting member in the folded position.

Figure 1:
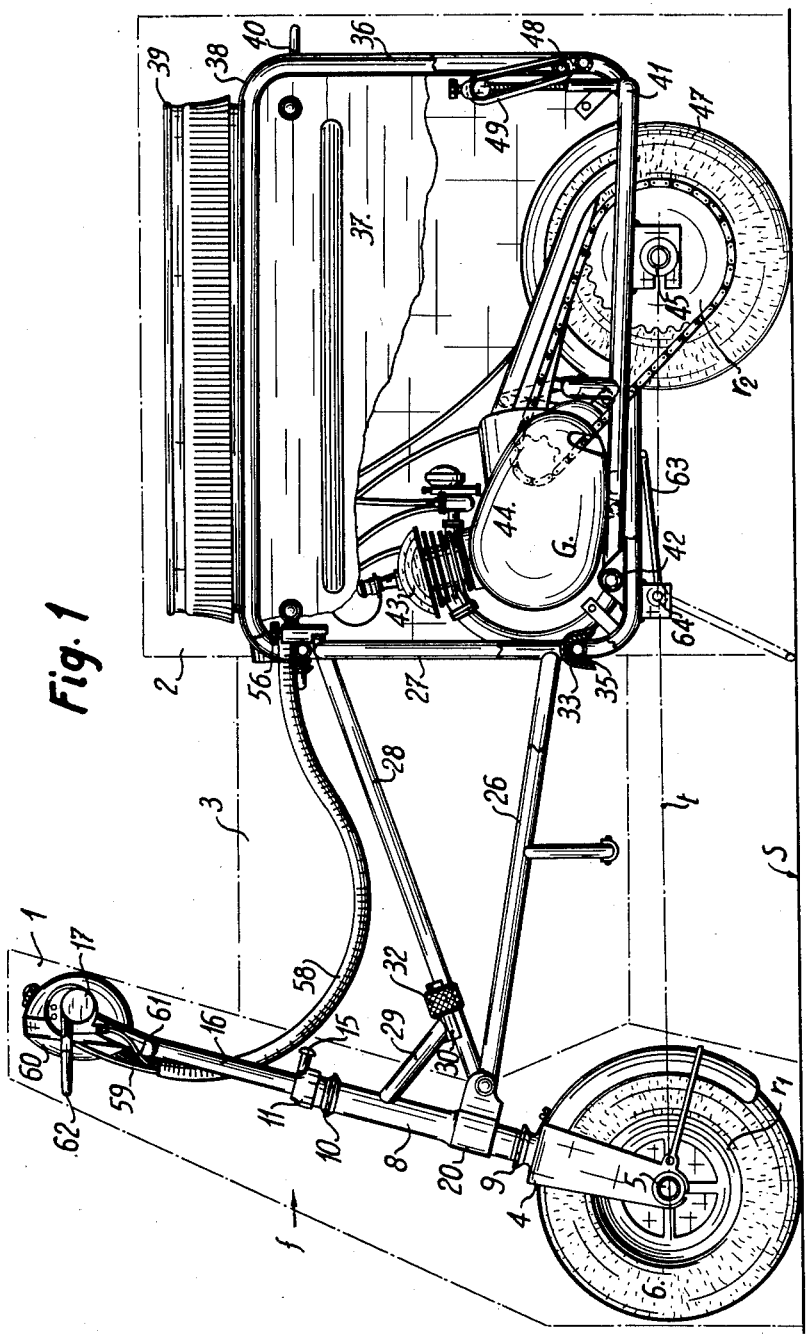
FIG. 1 is a profile view of the scooter in running condition, certain parts being broken away for the sake of clarity.

According to the accompanying drawing, the scooter comprises a front part 1 and a rear part 2 united by a connecting member 3. The front part comprises a front fork 4 on which is rigidly fixed a shaft 5. On the said shaft pivots a wheel $r_1$ provided with a pneumatic tyre 6. The front fork has a tube 7 (FIG. 5) engaged in a sleeve 8 and which pivots relative to the said sleeve by means of two ball thrust bearings 9 and 10 situated at the two ends of the said sleeve 8. A socket 11, screwed to the upper end of the tube 7 of the fork, is provided with a bolt 12 sliding in a guide 13 and subjected to the action of a spring 14. The said bolt carries an operating member 15, and the spring 14 tends to maintain the end of the bolt 12 engaged in a bore made in a rod 16 carrying the handle-bar 17. The said rod 16 is engaged in the tube 7 of the fork and its lower end has two notches 18 in engagement with a diametrical pin 19 integral with the tube 7 of the fork. The said pin 19, engaged in the notches 18, resists an angular movement of the handle-bar relative to the fork, while the bolt 12 determines the axial position of the rod of the handle-bar relative to the tube of the fork.

The sleeve 8 carries a bracket 20 situated adjacent to its lower end. The said bracket has two legs 21 (FIG. 4) each provided with a bore through which passes a spindle 22 secured by nuts 23. The connecting member 3 has the general shape of a pyramid provided at its apex with a nose 24 which pivots, through the agency of a sleeve 25 of elastic material, on the spindle 22.

The intermediate member 3 is constituted by a first U-shaped member 26 which forms one of the sides of the pyramid and a second U-shaped member 27 which forms the base of the pyramid, and a tie-rod 28 connecting the middle portions of the two members 26 and 27 and situated in the symmetry plane of the said two members which are fixed to each other by the ends of their legs. The three members 26, 27 and 28 thus form a pyramid which cannot lose its shape.

The running position (FIG. 1) of the front fork relative to the connecting member 3 is determined by a brace 29 integral with the upper part of the sleeve 8. The said brace is provided with a supporting member 30 having the shape of a spout the inner surface of which is coated with a layer of flexible and elastic material. A locking device, constituted by a ring 32 sliding along the tie-rod 28 and engaged on the supporting member 30, holds the said member against the tie-rod 28 and fixes the running annular position of the front fork relative to the connecting member 3.

A supporting member 33 is secured to the lower end of the legs of the member 27 and constitutes the third edge of the base of the pyramid, the two other being constituted by the legs of the member 27. The said supporting member 33 has the shape of a spout the inner surface of which is coated with a layer 34 of supple and elastic material which bears on a transverse element 35 of the rear part of the vehicle.

The said rear part comprises a chassis 36 having the general shape of a parallelepiped and provided with side panels 37, as well as with a cover 38 provided with a saddle 39 and hinged at 40 to the chassis.

A cradle 41 hinged relative to the chassis on a spindle 42 located adjacent to the centre of gravity G of the vehicle, carries an engine 43, a change-speed gear 44 and a shaft 45 on which pivots a rear wheel $r_2$ provided with a pneumatic tyre 47. The end of the cradle 41 opposite to the hinged spindle 42 is connected to a cross-bar 48 of the chassis by elastic rings 49 which constitute the suspension of the chassis.

The element 35 integral with the chassis and on which bears one of the edges of the base of the pyramid is located adjacent to the centre of gravity G of the vehicle and of the plane $t$ containing the shafts of the front and rear wheels.

The rear end of the tie-rod 28 carries a flap 50 provided with a bore 52 and which constitutes one of the parts of a holding device the second part of which is constituted by a bolt 53 sliding in a guide 54 integral with a transverse element 55 of the chassis. The said bolt carries an operating member 56, and a spring 57 tends to engage it in the bore 52. The vehicle, described above and shown in FIG. 1, in running condition, is easily dismantled, its front part, as well as the connecting member being then stowed away in the case formed by the chassis 36, the panels 37 and the cover 38.

In order to dismantle the front part of the vehicle, the user accomplishes the following operations:

(1) He exerts a pull on the operating member 15, in order to free the bolt 12, then he exerts an axial pull on the handle-bar, in order to free its rod 16 from the tube 7 of the fork. The freed handle-bar remains, however, connected to the rear part of the vehicle by a sheath 58 enclosing and protecting the electric wires 59 supplying a head-light 60 and Bowden wires 61 connected to control-levers 62 of which only one is shown;

(2) He exerts a pull on the operating member 56, in order to free the bolt 53, and then, after having placed in operating position a crutch 63 hinged at 64 to the chassis 36, he frees the connecting member 3;

(3) He slides the ring 32 along the tie-rod 28, in order to free the supporting member 30 and to permit the oscillation of the connecting member about its hinged shaft in order to bring it to the position shown in FIG. 6 in which the front wheel is partly engaged inside the pyramid.

The handle-bar 16, 17, as well as the connecting member 3 and the front fork provided with its wheel may then easily be placed inside the case formed by the chassis. The said chassis having the shape of a case may be placed, for example, in the box of a motor vehicle.

In order to reassemble the scooter, the user accomplishes the reverse operations which offer no difficulty and can be effected very rapidly.

The foldable scooter described has the advantage of comprising a front fork, not suspended, which facilitates, to a great extent, the manufacture of the front part of the scooter and reduces its cost price. However, due to the fact that, on the one hand, the brace 29 is inclined rearwardly of the vehicle and in the direction of the ground S and, on the other hand, the pyramid bears, through one of its base edges, upon an element of the suspended chassis situated adjacent the centre of gravity G of the vehicle and adjacent to the plane containing the shafts of the front and rear wheels, the shocks to which are subjected the front part of the vehicle, which tend to oscillate the front fork rearwardly in the direction of the arrow f, are transmitted by the said brace to the connecting member 3 and exert on the latter a thrust directed rearwardly of the vehicle and towards the ground, so that the said connecting member retransmits the said thrusts on an element of the suspended chassis placed adjacent to the centre of gravity of the vehicle. It follows that the said shocks, to which the front fork is subjected during running, are absorbed by the suspension members of the chassis and that the vehicle offers a stability comparable to that of a vehicle in which the front fork is suspended.

Moreover, the thrusts exerted by the brace 29 on the tie-rod 28 tend to compress the layer 31 of elastic material, so that the weight of the ring 32 tends to engage the same on the supporting member 30. The said ring thus offers the advantage that it cannot be lost and of avoiding any risk of unlocking under the influence of the shocks to which the front part of the vehicle is subjected during running.

Since the connecting member 3 is principally subjected to thrusts directed rearwardly of the vehicle and towards the ground, the holding device 52, 53 is only subjected to very weak forces, its role being thus limited to holding the base of the pyramid in the plane of the front face of the case formed by the chassis.

One embodiment of the invention, object of the invention, has been herein described by way of example, but it is obvious that many variations may be provided without departing from the scope of protection claimed.

Thus, for example, the lower edge of the base of the pyramid could be constituted by a simple tube rigidly secured to the legs of the members 26 and 27 and the transverse element 35 of the chassis 36 could be constituted by an open spout directed upwardly and in which could bear the tube forming the lower edge of the base of the pyramid. The layer, of flexible material and which constitutes a shock absorbing member, may be integral with the lower edge of the base of the pyramid or of the transverse member 35 of the chassis.

According to a modification, the brace 29 could be integral with the tie-rod 28 and bear on the sleeve 8; a ring sliding along the said sleeve then constituting the locking member which maintains the front fork in running position relative to the pyramid.

The connecting member 3 could, according to a modification, have trapezium shaped cross sections, the tie-rod 28 being replaced, if desired, by two tie-rods disposed on either side of the symmetry plane of the U-shaped members 26 and 27. According to another modification, the said members could also be V-shaped. However, according to tests carried out, it would seem that the shape of the connecting member described with reference to the accompanying drawing is to be preferred, not only from the constructional point of view but also from the point of view of comfort for the user.

I claim:

1. A motor vehicle of the scooter type comprising a front part formed by a front fork and a handle-bar, a rear part including a box-like chassis, a rear wheel having a driving axis, an engine and a change-speed gear housed in and resiliently mounted with respect to said chassis, coupling means mechanically connected to said front part and to said rear part, said chassis being able to contain both said front part and said coupling means to facilitate the transport of said scooter, and in which said coupling means is constituted by a pyramid-like connecting member the base of which is, in the running position of the vehicle, located in a substantially vertical plane and being removably secured to said chassis, a supporting member, forming the lower edge of said pyramid-like connecting member, defining in transverse cross section the general shape of an inverted U, an element of said chassis located adjacent the center of mass of said vehicle and being parallel to the driving axis of said rear wheel, said supporting member engaging said element and thereby bearing the lower edge of said pyramid-like connecting member, a holding device for fixing the upper edge of said pyramid-like connecting member to said chassis, a sleeve forming part of said front part, said front fork pivoting inside said sleeve, hinging means connecting the apex of said pyramid-like connecting member to the lower part of said sleeve, a brace fast with the upper part of said sleeve, a locking device detachably connecting said brace to the upper edge of said pyramid-like connecting member defining the running position of said front part with respect to said pyramid-like connecting member and transmitting the shocks to which said fork is subjected to said pyramid-like connecting member in a direction rearward and towards the ground, whereby said pyramid-like connecting member retransmits said shocks to said chassis by the intermediary of the lower edge of said pyramid-like connecting member bearing on said element of said chassis.

2. A vehicle as claimed in claim 1 and in which said pyramid-like connecting member is formed of two U-shaped elements secured one to the other by the ends of their legs, a tie-rod located in the plane symmetrical to said two U-shaped elements and being rigidly fastened to the middle part of each of said two U-shaped elements.

3. A vehicle as claimed in claim 1 in which said locking device comprises a further supporting member rigidly fastened to said brace and which is adapted to be laid, in the running position of the vehicle, on a tie-rod forming the upper edge of said pyramid-like connecting member, a ring slidably mounted on said tie-rod which maintains said further supporting member against said tie-rod, said ring being automatically maintained through its own weight in its locked position while the vehicle is in its running position.

4. In a motor scooter, the combination of a rear part including a chassis having a box-like configuration, an engine resiliently suspended to said chassis, a rear wheel having a driving axis mounted to said chassis, said driving axis being operatively connected to said engine, a front part including a sleeve, handle bars detachably mounted in one end of said sleeve and a fork member detachably mounted in the other end thereof, a front wheel mounted in said fork member, a pyramid-like connecting member detachably connecting said rear part to said front part, an apex portion of said pyramid-like connecting member hingedly connected to said sleeve, a base portion of said pyramid-like connecting member having one part resiliently engaging said chassis adjacent the center of gravity of said motor scooter and another part rigidly connected to said chassis, and a brace-like member operatively connected between said sleeve and said pyramid-like connecting member while said motor scooter is in its running position to transmit the shocks to which said fork member is subjected to said pyramid-like connecting member in a rearward direction and towards the ground whereupon said pyramid-like connecting member retransmits the shocks to said chassis through said one part of said pyramid-like connecting member resiliently engaging said chassis, said front part and said pyramid-like connecting member capable of being stored in said chassis.

References Cited in the file of this patent

UNITED STATES PATENTS 2,839,146    Bouffort _____ June 17, 1958
2,910,130    Schlaphoff _____ Oct. 27, 1959